US008150426B2

(12) United States Patent
Daniel et al.

(10) Patent No.: US 8,150,426 B2
(45) Date of Patent: *Apr. 3, 2012

(54) METHOD FOR OPERATING A CELLULAR TELECOMMUNICATIONS NETWORK, AND METHOD FOR OPERATING A PERSONAL CELLULAR TELECOMMUNICATIONS DEVICE

(75) Inventors: Ronen Daniel, Ramat Gan (IL); Uri Baron, Ra'anana (IL); Yossi Wellingstein, Tel Aviv (IL)

(73) Assignee: Celltick Technologies Ltd., Herzliya (IL)

( * ) Notice: Subject to any disclaimer, the term of this patent is extended or adjusted under 35 U.S.C. 154(b) by 751 days.

This patent is subject to a terminal disclaimer.

(21) Appl. No.: 11/798,571

(22) Filed: May 15, 2007

(65) Prior Publication Data
US 2007/0218882 A1    Sep. 20, 2007

Related U.S. Application Data

(62) Division of application No. 11/385,650, filed on Mar. 22, 2006, which is a division of application No. 09/980,114, filed as application No. PCT/IL01/00037 on Jan. 14, 2001, now Pat. No. 7,039,423.

(51) Int. Cl.
*H04W 4/00* (2009.01)

(52) U.S. Cl. ........ 455/466; 709/219; 340/7.52; 370/473
(58) Field of Classification Search .................. 455/466, 455/403; 709/219; 340/7.52; 370/473
See application file for complete search history.

(56) References Cited

U.S. PATENT DOCUMENTS

| 5,553,314 | A |   | 9/1996  | Grube et al.   |           |
|-----------|---|---|---------|----------------|-----------|
| 5,555,446 | A |   | 9/1996  | Jasinski       |           |
| 5,687,216 | A |   | 11/1997 | Svensson       |           |
| 5,692,032 | A |   | 11/1997 | Seppanen et al.|           |
| 5,701,580 | A |   | 12/1997 | Yamane et al.  |           |
| 5,822,402 | A | * | 10/1998 | Marszalek      | 379/88.21 |
| 5,870,030 | A |   | 2/1999  | DeLuca et al.  |           |
| 5,878,033 | A |   | 3/1999  | Mouly          |           |

(Continued)

FOREIGN PATENT DOCUMENTS

EP    0 955 779 A1    11/1999

(Continued)

OTHER PUBLICATIONS

Global System for Mobile Communications, Digital Cellular Telecommunications System(Phase 2+) (GSM); Universal Mobile Telecommunications System (UMTS); USIM Application Toolkit (USAT);(3 GPP TS 31.111 (Dec. 2000)version 3.3.0; 1999); pp. 1-136.

(Continued)

*Primary Examiner* — Charles Appiah
*Assistant Examiner* — Alexander Yi
(74) *Attorney, Agent, or Firm* — Pearl Cohen Zedek Latzer, LLP

(57) ABSTRACT

For use in a cellular telecommunications network including a plurality of individually addressable Base Transceiver Stations (BTSs) providing bidirectional signal coverage over a predefined geographical area, capable of transmitting Point-To-MultiPoint (PTMP) messages over a Point-To-MultiPoint Service (PTMPS) functionality, and capable of transmitting Point-To-Point (PTP) messages, streaming of a substantially continuous stream of mostly different content, at least some interactive display messages on at least one personal cellular telecommunications device prior to their automatic discarding irrespective of their having been displayed or not.

32 Claims, 5 Drawing Sheets

U.S. PATENT DOCUMENTS

| | | | |
|---|---|---|---|
| 5,926,104 | A | 7/1999 | Robinson |
| 5,960,366 | A | 9/1999 | Duwaer |
| 6,018,522 | A | 1/2000 | Schultz |
| 6,060,997 | A | 5/2000 | Taubenheim et al. |
| 6,173,316 | B1 | 1/2001 | De Boor et al. |
| 6,212,203 | B1 * | 4/2001 | Anderson et al. ............ 370/473 |
| 6,230,019 | B1 | 5/2001 | Lee |
| 6,298,239 | B1 | 10/2001 | Yonemoto et al. |
| 6,341,228 | B1 | 1/2002 | Hubbe et al. |
| 6,363,419 | B1 * | 3/2002 | Martin et al. ................ 709/219 |
| 6,370,389 | B1 * | 4/2002 | Isomursu et al. ............ 455/466 |
| 6,385,461 | B1 | 5/2002 | Raith |
| 6,441,720 | B1 * | 8/2002 | Kawashima ................ 340/7.52 |
| 6,442,529 | B1 | 8/2002 | Krishan et al. |
| 6,583,714 | B1 * | 6/2003 | Gabou et al. ................ 340/5.54 |
| 6,615,039 | B1 | 9/2003 | Eldering |
| 6,628,936 | B1 | 9/2003 | Furuya |
| 6,807,254 | B1 | 10/2004 | Guedalia et al. |
| 7,003,327 | B1 | 2/2006 | Payne et al. |
| 7,113,809 | B2 | 9/2006 | Noesgaard et al. |
| 7,561,899 | B2 | 7/2009 | Lee |
| 2001/0020957 | A1 | 9/2001 | Ringot |
| 2003/0181201 | A1 | 9/2003 | Bomze et al. |
| 2004/0077340 | A1 | 4/2004 | Forsyth |
| 2004/0078427 | A1 | 4/2004 | Gil et al. |
| 2004/0127199 | A1 | 7/2004 | Kagan et al. |
| 2004/0157628 | A1 | 8/2004 | Daniel et al. |
| 2006/0234896 | A1 | 10/2006 | Thomas et al. |

FOREIGN PATENT DOCUMENTS

| | | |
|---|---|---|
| GB | 2320600 A | 6/1998 |
| GB | 2327567 A | 1/1999 |
| WO | WO 98/10604 | 3/1998 |
| WO | WO 98/10604 A1 | 3/1998 |
| WO | WO 98/41013 | 9/1998 |

OTHER PUBLICATIONS

Peter C. Bell; Adaptive Sales Forecasting with Many Stockouts; J. Op. Res. Soc. 1981; vol. 32, pp. 865 to 873.

Peter C. Bell; A New Procedure for the Distribution of Periodicals; J. Opl. Res. Soc. 1978; vol. 29, 5, pp. 427-434.

Office Action issued by the United States Patent and Trademark Office for U.S. Appl. No. 11/798,572 dated Jan. 19, 2010.

Office Action issued by the United States Patent and Trademark Office for U.S. Appl. No. 11/798,572 dated Jun. 25, 2010.

Office Action issued by the United States Patent and Trademark Office for U.S. Appl. No. 11/798,572 dated Jan. 21, 2011.

Office Action issued by the United States Patent and Trademark Office for U.S. Appl. No. 12/982,686 dated May 2, 2011.

Office Action issued by the United States Patent and Trademark Office for U.S. Appl. No. 11/385,650 dated Jun. 26, 2008.

Office Action issued by the United States Patent and Trademark Office for U.S. Appl. No. 11/385,650 dated Jan. 26, 2009.

Office Action issued by the United States Patent and Trademark Office for U.S. Appl. No. 11/385,650 dated Jun. 8, 2009.

* cited by examiner

| | NATIONAL | SCHOOLS | HIGHWAYS |
|---|---|---|---|
| 08:00-08:15 | NEWS | NEWS | NEWS |
| 08:15-08:30 | HOROSCOPE | ANTI-DRUG | TRAFFIC UPDATE |
| 08:30-08:45 | FINANCE | TOP 10 | FINANCE |
| 08:45-09:00 | LOCAL | LOCAL | TRAFFIC UPDATE |
| 09:00-09:15 | NEWS | NEWS | NEWS |

METHOD FOR OPERATING A CELLULAR TELECOMMUNICATIONS NETWORK, AND METHOD FOR OPERATING A PERSONAL CELLULAR TELECOMMUNICATIONS DEVICE

CROSS-REFERENCE TO RELATED APPLICATIONS

This application is a second divisional application of prior application Ser. No. 11/385,650 filed Mar. 22, 2006; which in turn is a divisional application of prior application Ser. No. 09/980,114 filed Mar. 4, 2002, now U.S. Pat. No. 7,039,423 B2 issued on May 2, 2006; which in turn was the National Stage of International Application No. PCT/IL01/00037 having an international filing date of Jan. 14, 2001, which in turn claims priority on Israeli application No. 134,035 filed Jan. 13, 2000; all of which applications are incorporated herein in their entirety by reference.

FIELD OF THE INVENTION

The invention relates to the operation of cellular telecommunications networks, and personal cellular telecommunications devices.

BACKGROUND OF THE INVENTION

Global Networks for Mobile Communications (GSM) digital cellular telecommunications networks have now been deployed alongside wireline telecommunications networks in over a 100 countries. GSM supports a so-called Short Message Service (SMS) functionality in two flavors: point-to-point for sending a point-to-point message (SMS/PP) from a network operator to a single personal cellular telecommunications device, and point-to-multipoint for sending a Cell Broadcast (SMS/CB) message from a network operator to a plurality of personal cellular telecommunications devices located in one or more cells. For more details regarding the different classes of SMS messages, reference can be made to ETSI TS 100 900 Version 7.2 (GSM 03.38 Version 7.2), the contents of which are incorporated by reference.

In WO98/10604 entitled "Interactive Cell Broadcast Service", there is illustrated and described a method and apparatus for transmitting SMS/CB display messages to subscribers who are prompted to respond by depressing a pushbutton for immediately originating either a telephone call or an SMS/PP message to an embedded callback number. One particular application of the interactive cell broadcast service is for requesting a service which can then be provided by so-called over the air programming. Each SMS/CB message is displayed on the entire display screen either immediately upon its receipt, or when requested by the user (see page 11, lines 27-29 of the specification). Both approaches severely limit the interactive cell broadcast service in terms of the rate at which SMS/CB messages can be transmitted as follows. In the former, immediately displaying SMS/CB messages on a display screen annoyingly interrupts the operation of the device from the point of view of the subscriber who would therefore be inclined to disable the service. And in the latter, storing SMS/CB messages requires considerable memory resources, and requiring a user to retrieve each SMS/CB message individually (and thereafter delete them individually) is time consuming and battery wasteful.

SUMMARY OF THE INVENTION

Broadly speaking, the present invention is directed toward the streaming of mostly different content at least some interactive display messages on personal cellular telecommunications devices for the benefit of subscribers for no more than their occasional glancing at their personal cellular telecommunications devices' display screens which they often do anyway, for example, to check the time. The present invention can display both Point-To-Point (PTP) display messages and Point-To-MultiPoint (PTMP) display messages but in the case that PTP display messages and PTMP display messages are simultaneously transmitted over their respective air interface channels, the former display messages typically have a higher display priority than the latter such that they are preferentially displayed.

The display messages are intended to have mostly different content including inter alia news items, financial information, promotional offers, and the like, in the form of alphanumeric messages, graphic messages, video clips, and the like. Whilst some display messages will by their nature be repeated on a regular basis, for example, display messages advertising a soft drink, the term mostly different is intended to convey that identical display messages are not display during consecutive time intervals of, say, between 1 minute and 5 minutes. At least some of the display messages are intended to be interactive in the sense that a subscriber can automatically activate a point-to-point transmission response mechanism from a dedicated response means integrally provided in a display message. The existence of a dedicated response means does not necessarily have to be indicated on a display message to a subscriber but can be understood by him as being available a matter of course. A response mechanism can be pushbutton activated, voice activated, or touchpad activated. In the case of pushbutton activated response means, each response means may be a dedicated "MORE INFO" key, or a key selectively dedicated for the response means but otherwise a conventional key, for example, the key "*" as may appear in a display message, for example, "PRESS * FOR MORE INFO". The display messages are preferably transmitted at a maximum rate of a new display message about every 5 seconds on a so-called 24/7 basis i.e. all day every day, thereby, on the one hand, rendering an interesting eye catching service of streaming display messages but, on the other hand, still providing sufficient response time for a subscriber to activate a response mechanism. Obviously, display messages can be transmitted at slower rates, say, down to one display message about every 2 minutes, or even slower, say, one display message about every 5 minutes, and for shorter periods, say, 10 minutes of display messages on the hour during peak broadcasting hours only.

The display messages can occupy different regions of a display screen as follows: First, they can replace a so-called "idle screen" typically occupying the entire space of a display screen for displaying inter alia network related information, for example, the name of an operator, time, signal strength, batter; strength, the presence of one or more voice messages and/or SMS messages stored in a permanent storage buffer prior to their deletion, and the like. And second, they can occupy a portion of a split screen, for example, a horizontally disposed banner portion, also typically having a major portion for normally displaying an idle screen. In the latter instance, the banner portion may be a permanent feature of a display screen or it may be replaced together with the first portion in a similar manner to the first instance on the invoking of a non-idle activity specific screen having at least some indication of an ongoing activist including inter alia the entire process from establishment to tear down of a voice call irrespective of whether a subscriber is the originating party or the receiving party, and any other subscriber initiated activity, for example, retrieving an item stored in memory, playing a game, writing a memo, and the like. An exemplary "idle screen" within the spirit of the present invention is displayed in the so-called User Idle Screen Available Event (see 3GPP TS 31.111 V4.0.0 3rd Generation Partnership Project; Technical Specification Group Terminals; USIM Application Toolkit (USAT) (Release 4)).

The envisaged streaming of display messages provides a most convenient platform for m-commerce applications, and in particular interactive m-commerce applications catering for a wide range of ages, lifestyles, and the like. It is believed that its exposure to the general public will be far greater than that of conventional radio, television and cable broadcasting services taking into consideration the ubiquity of personal cellular telecommunications devices, the fact that most subscribers now take their personal cellular telecommunications devices wherever they go, and the fact that they are in idle mode for most of the time that they are powered on. Moreover, unlike conventional broadcasting services which are at best regional services, since each BTS can be individually addressed, the present invention readily facilitates the transmitting of far more location specific content down to the granularity of a single BTS than hitherto achievable. In this connection, additional BTSs can also be readily deployed for the sole purpose of transmitting specific content at particular locations.

BRIEF DESCRIPTION OF THE DRAWINGS

In order to understand the invention and to see how it can be carried out in practice, a preferred embodiment will now be described, by way of a non-limiting example only, with reference to the accompanying drawings, in which similar parts are likewise numbered, and in which.

DETAILED DESCRIPTION OF THE PREFERRED EMBODIMENTS

Figure 1:
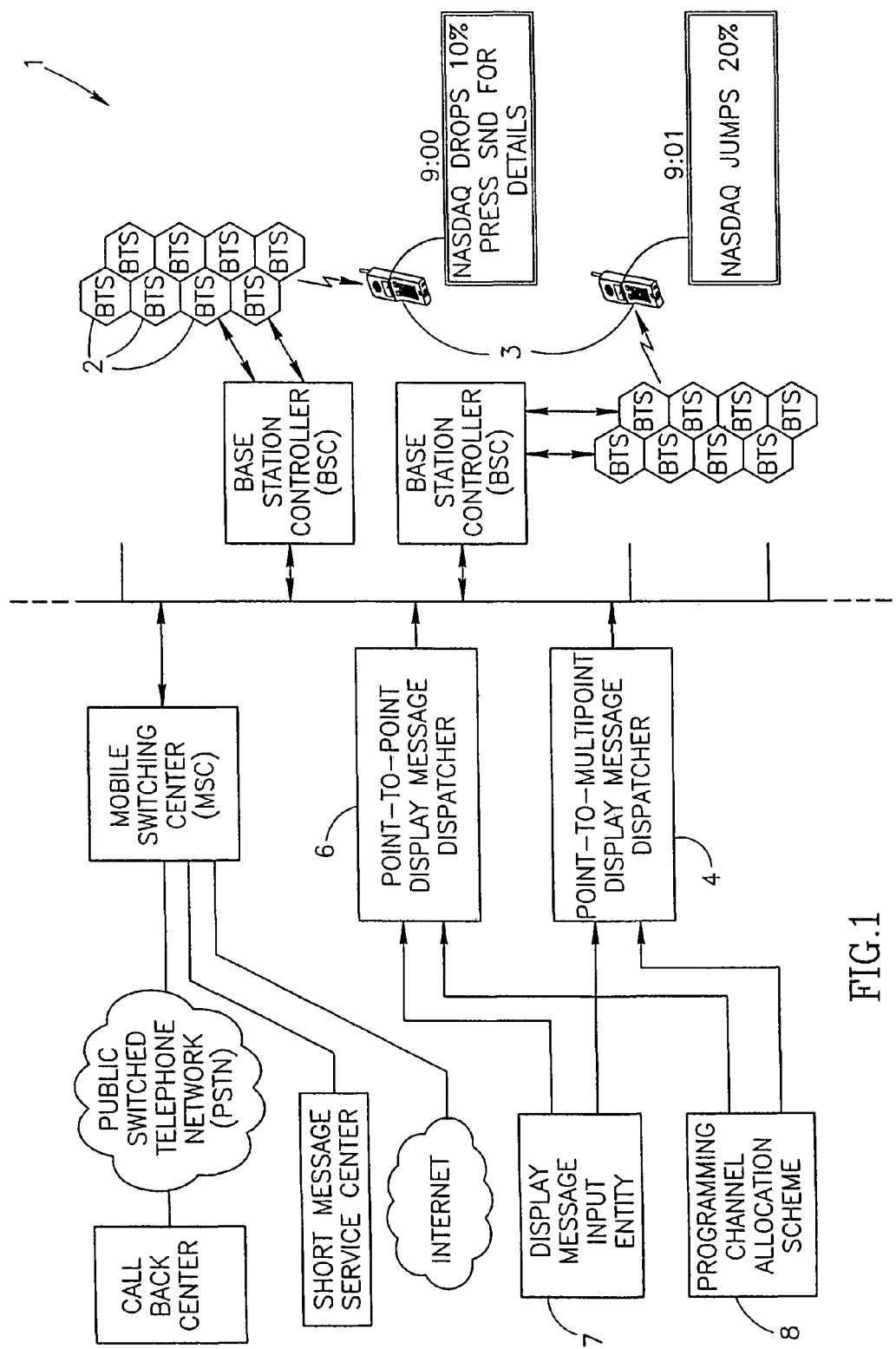
FIG. 1 is a schematic representation of a cellular telecommunications network for transmitting a multi-programming channel 24/7 cellular broadcasting service for the streaming of display messages on personal cellular telecommunications device in a screen saver-like manner.

FIG. 1 shows a cellular telecommunications network 1 capable of transmitting a multi-programming channel 24/7 cellular broadcasting service to a plurality of individually addressable BTSs 2 each providing bidirectional signal coverage over a predefined geographical area ranging from so-called typically indoor pico cells each covering a few square meters through so-called micro cells each covering anywhere from a few tens to a few hundreds of square meters upto cells covering several square kilometers. The BTSs 2 are each capable of transmitting Point-To-MultiPoint (PTMP) display messages and Point-To-Point (PTP) display messages for streaming mostly different content, mostly interactive display messages on personal cellular telecommunications devices 3. The PTMP display messages are dispatched from a Point-To-MultiPoint Display Message Dispatcher 4 and the PTP display messages are dispatched from a Point-To-Point Display Message Dispatcher 6. Both the PTMP display messages and the PTP display messages originate at a Display Message Input Entity 7. The devices 3 include inter alia simple handset phones, smartphones, combined PDA/phones, combined MIP3 music players/phones, and the like.

Figures 2, 3:
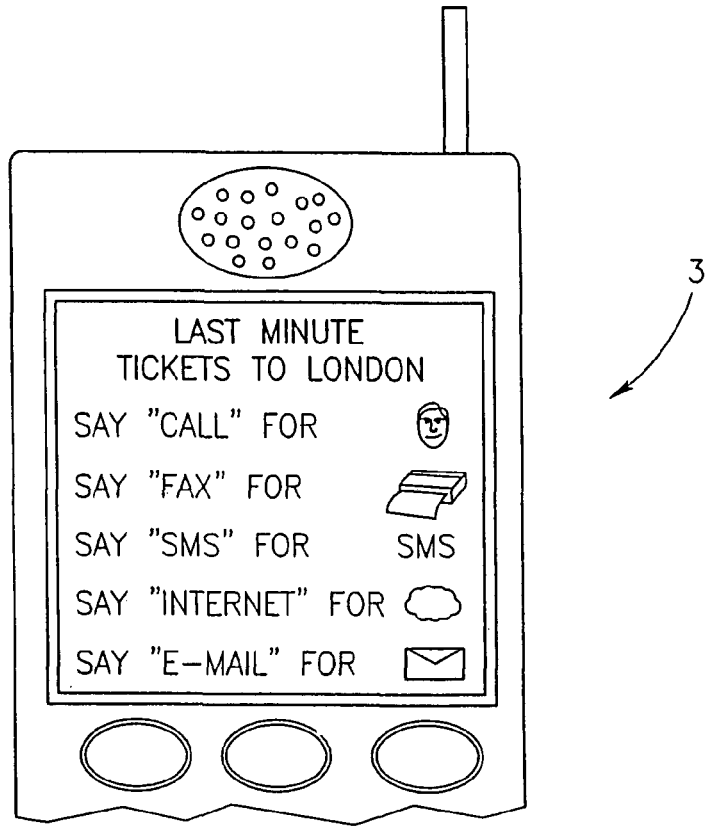
FIG. 2 is a schematic representation of a voice activated display message for enabling subscriber activation of one of at least two point-to-point transmission response mechanisms.
FIG. 3 is a schematic representation showing the programs to be broadcast during the first hour of each of three programming channels of the cellular broadcasting service.

FIG. 1 also shows two exemplary successive time-sensitive display messages displayed in a screen saver-like manner replacing a normally displayed idle screen. The display messages include "NASDAQ DROPS 10% PRESS AND FOR DETAILS" display at 9:00 and "NASDAQ JUMPS 20%" displayed at 9:01. The 9:00 display message is an example of a display message prompting a subscriber as to the action required by him to obtain additional information from an information provider. Against this, the 9:01 display message is an example of a display message which does not prompt a subscriber as to which action is needs to take to obtain additional information since he is already cognizant of the fact that pressing the SND key will automatically connect him to a suitable information service. FIG. 2 shows a display message prompting a subscriber to activate a point-to-point transmission response mechanism from the list of: a voice call; an SMS; a data session, for example, an Internet browsing session, a SIM browsing session, and the like; e-mail; and a facsimile transmission.

FIG. 3 shows that a cellular broadcasting service can include a non-geocoded or nationwide programming channel, and one or more geocoded programming channels for transmitting streams of PTMP and PTP display messages from logical groups of BTSs each including one or more BTSs. Each logical group of BTSs either covers an extended contiguous geographical area, for example, a metropolitan area or geographical areas sharing a common theme, for example, schools, along highways, and the like. The programming channels typically include time slots for transmitting programs which are either common to both the nationwide programming channel and the geocoded programming channels, for example, the News, or dedicated to a particular logical group of BTSs, for example, an Anti-drug program for transmission at BTSs of the logical group of BTSs which cover schools, Traffic updates for transmission at BTSs of the logical group of BTSs which cover major highways, and the like. Also, a geocoded programming channel can be itself segmented to two or more so-called geocoded programming sub-channels each to be transmitted at a subset of the BTSs of the logical group of BTSs associated with the geocoded programming channel. For example, the school programming channel can be segmented to an elementary school programming sub-channel, a high school programming sub-channel, and a college programming sub-channel.

It should be noted that a BTS may be assigned to one or more geocoded programming channels depending on its location, for example, a BTS which covers a geographical area containing both a football stadium and a shopping mall in most likelihood will be assigned to both a sports programming channel and a shopping programming channel of the cellular broadcasting service to maximize its efficacy in terms of geocoded content. In such instance, a programming channel allocation scheme 8 can be provided for determining which stream of PTMP or PTP display messages should be displayed at each BTS. The schemes can be time dependent, for example, sports programming channel be transmitted during a time interval starting 2 hours before the start of a football match and ending 2 hours after the football match ends, the shopping programming channel be transmitted at other times when available for transmission, and the nationwide programming channel be transmitted at all other times that neither the sports programming channel nor the shopping programming channel are available for transmission.

Figure 4:
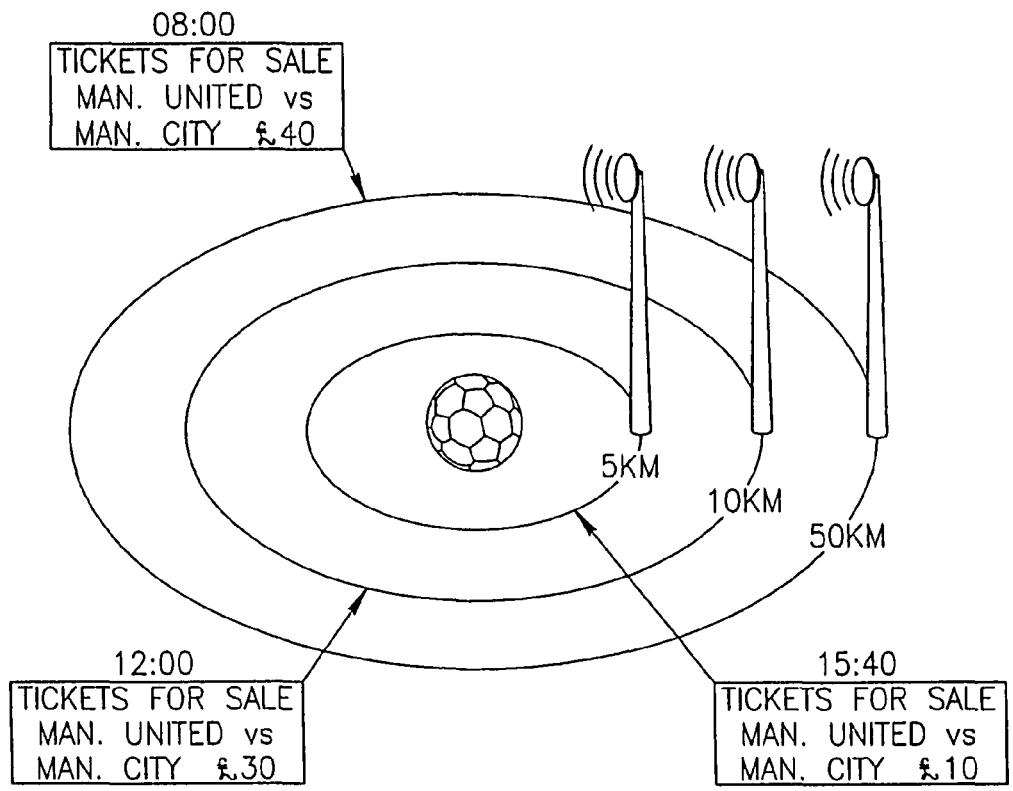
FIG. 4 is a schematic representation showing a staggered sequence of display messages for advertising tickets for a football game over progressively smaller geographical areas at progressively lower purchase prices.

FIG. 4 shows a staggered sequence of display messages for advertising tickets for a football game to take place at a stadium over progressively smaller geographical areas and at progressively lower prices on the same day as the game assuming that unsold tickets still available. Such display messages may be either PTMP display messages, or PTP display messages transmitted to subscribers listed in the fan club of the stadium's home team. The geographical areas are usually centered around the stadium, and are such that a subscriber can still reach the stadium in time for kick-off. Such an advertising campaign can be readily applied to other items with either a fixed "sellby" date or a limited stock, for example, for advertising a clearance sale of consumer items at a retail outlet.

Figure 5:
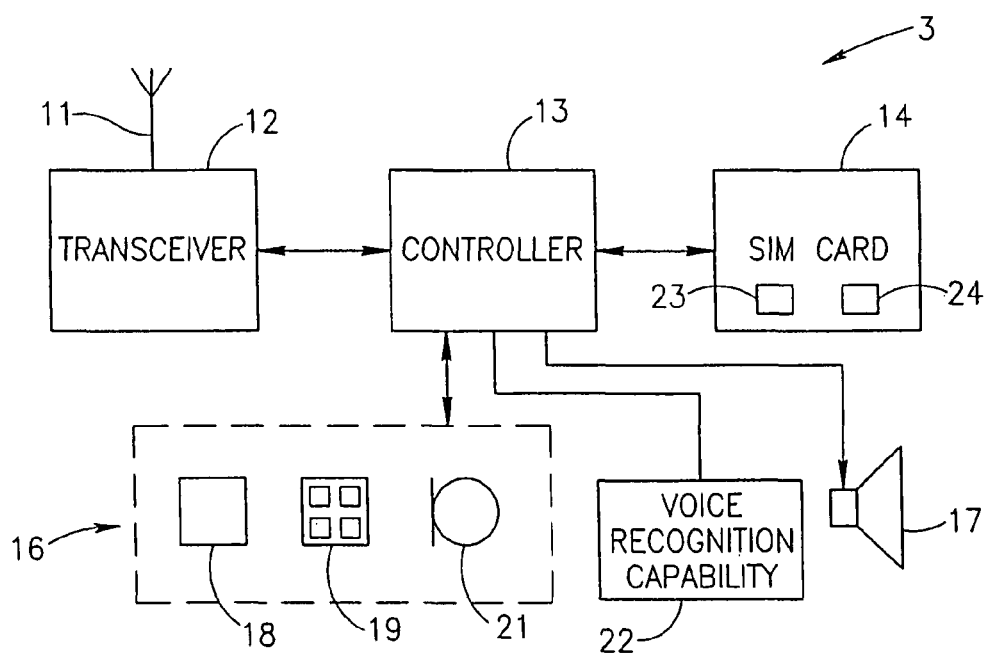
FIG. 5 is a schematic representation of a personal cellular telecommunications device for supporting the streaming of display messages thereon in a screen saver-like manner.

FIG. 5 shows a GSM based personal cellular telecommunications device 3 including an antenna 11, a transceiver 12, a controller 13 providing a clock time denoted T.sub.CLOCK, a SIM card 14 (constituting a smart card), a subscriber interface 16, and a loudspeaker 17. The subscriber interface 16 includes a display screen 18, a keypad 19, and a microphone 21. The display screen 18 may be a touchpad. The device 3 may also include a voice recognition capability 22 for supporting voice activated activities including inter alia dialing, invoking a response mechanism, and the like. The SIM card 14 includes two fixed size dynamic storage buffers 23 and 24 for temporarily storing PTMP display messages and PTP display messages, respectively, passed thereto by the controller 13 prior to their being automatically discarded in accordance with a display message discard scheme irrespective of their having been displayed or not. The entire handling of a display message from its receipt through to its being automatically discarded is a completely silent process irrespective of whether the display message is displayed or not.

Figure 6:
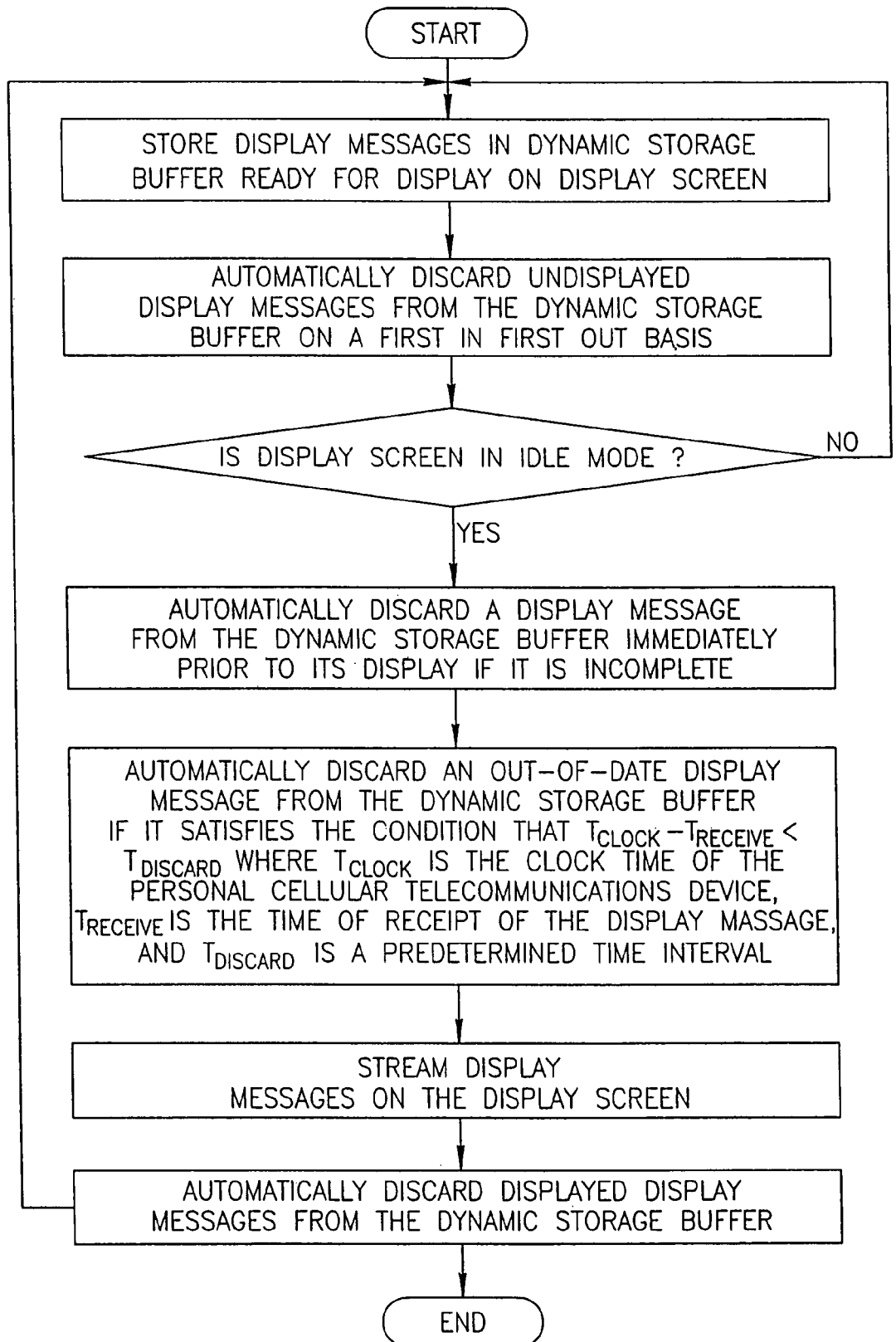
FIG. 6 is a flow diagram for streaming display messages on a personal cellular telecommunications device in a screen saver-like manner.

The operation of the screen saver-like application in respect of each of the dynamic storage buffers 23 and 24, as shown in FIG. 6, is as follows: The display message discard scheme automatically discards undisplayed display messages from a dynamic storage buffer on a First In First Out basis, thereby ensuring that the dynamic storage buffer only stores the most recently received display messages, and automatically discards display messages after they are displayed. In addition, assuming that the display screen is available for display of a display message, immediately before a display message is actually displayed, the following checks are made: First, since display messages may be incomplete due to any one of several occurrences, for example, air interface interference, hand over between cells, and the like, each display message is checked for completeness and if it is found to be incomplete, it is automatically discarded. Second, since at least some of the display messages are time sensitive, each display message is checked for its not being out-of-date by its satisfying the following condition:

$$T_{CLOCK} - T_{RECEIVE} < T_{DISCARD};$$

where $T_{CLOCK}$ is the clock time, $T_{RECEIVE}$ is the time of receipt of the message, and $T_{DISCARD}$ is a predetermined time interval, for example, three minutes, which is necessary.

Figure 7A:
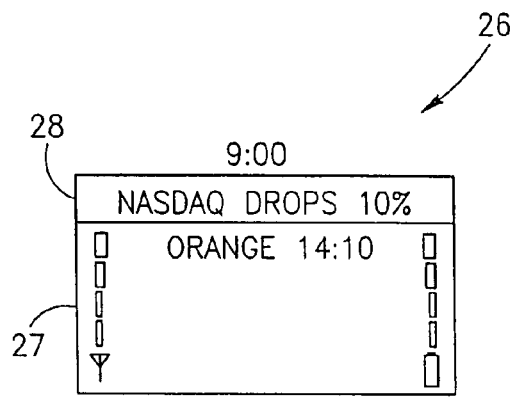
FIGS. 7A-7D are schematic representations of different modes of operation of a personal cellular telecommunications device having a split screen display screen.
Figure 7B:
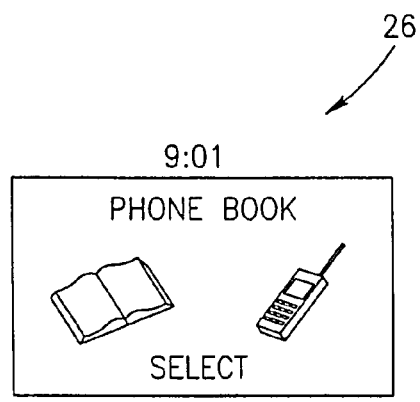
Figure 7C:
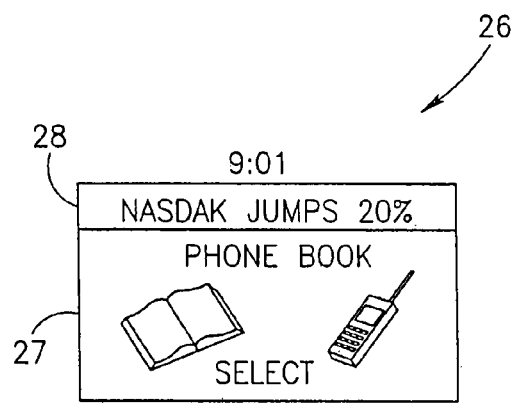
Figure 7D:
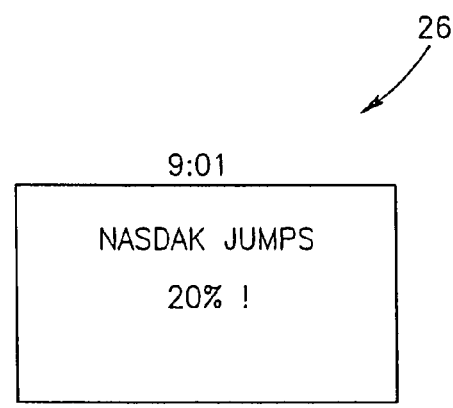

FIGS. 7A-7D show different modes of streaming of display messages on a personal cellular telecommunications device having a split screen display screen 26 including a major portion 27, and a minor horizontal banner portion 28. FIG. 7A shows that the major portion 27 displays an idle screen whilst the banner portion 28 shows a stream of at least some interactive display messages whilst FIG. 7B shows that the display messages are only displayed on the banner portion 28 when the idle screen is displayed on the major portion 27. FIG. 7C shows that the banner portion 28 is a permanent feature of the split screen display screen 26 either occupying only a portion thereof, or that it can be extended to include the entire display screen 26 instead of the major portion 27 displaying an idle screen (see FIG. 7D).

While the invention has been described with respect to a limited number of embodiments, it will be appreciated that many variations, modifications, and other applications of the invention can be made within the scope of the appended claims. For example, whilst the present invention has been described in parts with reference to its GSM implementation, it is suitable for implementation by both existing or still evolving technologies including inter alia PCS, GPRS, 3G, CDMA, UMTS, W-CDMA, and the like, and/or both existing and still evolving services including inter alia PTM-M, PTM-G, IP-M, MDS, and the like.

We claim:

1. A cellular telecommunications method including
a) Receiving a plurality of individual, interactive display messages by a personal cellular telecommunications device without any action by a user of said device, said device having a display screen that normally displays an idle screen, and each interactive message having mostly different content from the other plurality of interactive display messages and enabling a user of said device to activate a point to point transmission response mechanism;
b) Temporarily storing each of said received interactive display messages in a dynamic storage buffer contained in said telecommunications device;
c) Checking that at least some display messages are complete before being displayed;
d) If an idle screen is being displayed, streaming individual ones of said stored complete display messages from said dynamic storage buffer for display on at least a portion of said display screen without any user action being required;
e) Interrupting said displaying of said streaming display message to display a non-idle activity specific screen; and
f) Automatically discarding display messages from said dynamic storage buffer in accordance with a display message discard scheme irrespective of a display message having been displayed on the display screen or not, wherein for at least some display messages, an out-of-date display message is automatically and silently discarded if it satisfies the condition that $T_{CLOCK} - T_{RECEIVE} > T_{DISCARD}$ where $T_{CLOCK}$ is the clock time of the personal cellular telecommunications device, $T_{RECEIVE}$ is the time of receipt of the display message at the personal cellular telecommunications device, and $T_{DISCARD}$ is a predetermined time interval.

2. The method as claimed in claim 1 wherein the display message discard scheme automatically discards undisplayed display messages from the dynamic storage buffer on a First In First Out basis.

3. The method as claimed in claim 1 wherein the display message discard scheme automatically discards a display message immediately prior to its display if it is incomplete.

4. The method as claimed in claim 1 wherein the display message discard scheme automatically discards displayed display messages from the dynamic storage buffer.

5. The method as claimed in claim 1 wherein a PTP display message ready for display is displayed on the display screen in preference to a PTMP display message ready for display.

6. The method as claimed in claim 1 wherein the entire handling of a display message from its receipt through to its being automatically discarded is a completely silent process irrespective of whether the display message was displayed on the display screen or not.

7. The method as claimed in claim 1 wherein the display messages are sent by a cellular broadcasting service consisting of a substantially continuous stream of PTMP display messages for streaming display on a plurality of personal cellular telecommunications devices.

8. The method as claimed in claim 1 wherein the display messages are sent by a cellular broadcasting service consisting of a substantially continuous stream of PTP display messages for streaming display on a particular personal cellular telecommunications device.

9. A computer program encoded into a non-transitory computer-readable medium in a personal cellular telecommunications device so that the personal cellular telecommunications device programmed in this way when executing the program is configured to carrying out a method as claimed in claim 1.

10. A non-transitory program storage device readable by a personable cellular telecommunications device tangibly embodying a program of instructions executable by the personal cellular telecommunications device for carrying out a method as claimed in claim 1.

11. A computer-readable smart card having encoded thereon a program, said smart card operable with a personal cellular telecommunications device so that the program, when executed by the personal cellular telecommunications device, configures the personal cellular telecommunications device to carry out a method as claimed in claim 1.

12. A method of operating a cellular telecommunications network comprising:
a) providing a plurality of interactive display messages that are to be received by a personal cellular telecommunications device having a display screen and that are to be handled automatically by said telecommunications device from the receipt of the display message to the discarding of the display message, said provided display messages having mostly different content and being for a streaming display only on at least a part of an idle screen of said display screen of said telecommunications device, said display messages further being of a type that can be automatically stored in and discarded from a dynamic storage buffer contained in the telecommunications device wherein said dynamic storage buffer also permits the enabling of a user of said telecommunications device to activate a point to point transmission response mechanism that is integrally provided in said display message; said telecommunications device receiving a plurality of individual, interactive display messages, checking that at least some display messages are complete before being displayed, temporarily storing each of said received interactive display messages in said dynamic storage buffer, and if an idle screen is being displayed, streaming individual ones of said stored complete display messages from said dynamic storage buffer for display on at least a portion of said display screen, and interrupting said displaying of said streaming display message to display a non-idle activity specific screen, and automatically discarding display messages from said dynamic storage buffer in accordance with a display message discard scheme irrespective of a display-message having been displayed on the display screen or not, wherein for at least some display messages, an out-of-date display message is automatically and silently discarded if it satisfies the condition that $T_{CLOCK}-T_{RECEIVE}>T_{DISCARD}$ where $T_{CLOCK}$ is the clock time of the personal cellular telecommunications device, $T_{RECEIVE}$ is the time of receipt of the display message at the personal cellular telecommunications device, and $T_{DISCARD}$ is a predetermined time interval;
b) broadcasting over a particular programming channel a stream of said provided interactive display messages by one or more of a plurality of individually addressable Base Transceiver Stations (BTS) that are part of said cellular telecommunications network, each said BTS providing bidirectional signal coverage over a predefined geographical area and capable of transmitting Point-To-Multi Point (PTMP) messages over a PTMP Service functionality and capable of transmitting and receiving Point-To-Point (PTP) messages, said display messages being broadcast without consideration of their being received, being displayed, being retained or being discarded on a telecommunications device that has received said display messages; and
c) receiving a message from a telecommunications device as a result of a user of said telecommunications device activating a transmission response mechanism that has been enabled by one of the broadcasted interactive display messages.

13. The method as claimed in claim 12 wherein the step of transmitting streams display messages at the rate of between one display message about every 5 seconds to one display message about every 5 minutes.

14. The method as claimed in claim 12 wherein the step of transmitting streams display messages at the rate of between one display message about every 5 seconds to one display message about every 2 minutes.

15. The method as claimed in claim 12 wherein the step of transmitting includes simultaneously transmitting at least two streams of different content display messages, and further comprising the step of providing a programming channel allocation scheme for determining the stream of display messages to be transmitted at each BTS.

16. The method as claimed in claim 12 wherein the display messages are sent by a cellular broadcasting service consisting of a substantially continuous stream of PTMP display messages for streaming display on a plurality of personal cellular telecommunications devices.

17. The method as claimed in claim 12 wherein the display messages are sent by a cellular broadcasting service consisting of a substantially continuous stream of PTP display messages for streaming display on a particular personal cellular telecommunications device.

18. The method as claimed in claim 12 wherein the cellular telecommunications network is a GSM network and the display messages are of the SMS Class 2 type.

19. A computer program encoded into a non-transitory computer-readable medium in a cellular telecommunications network so that the cellular telecommunications network when executing the program carries out a method in accordance with claim 12.

20. A non-transitory program storage device readable by a cellular telecommunications network tangibly embodying a program of instructions executable by the cellular telecommunications network for carrying out a method in accordance with claim 12.

21. A method of operating a cellular telecommunications network comprising:
    a) providing a plurality of interactive display messages that are to be received by a personal cellular telecommunications device having a display screen and that are to be handled automatically by said telecommunications device from the receipt of the display message to the discarding of the display message in a completely silent process without any action by a user of said telecommunications device, said provided display messages having mostly different content and being for a streaming display only on at least a part of an idle screen of said display screen of said telecommunications device, said display messages further being of a type that can be automatically stored in and discarded from a dynamic storage buffer contained in the telecommunications device and that also permits the enabling of a user of said telecommunications device to activate a point to point transmission response mechanism that is integrally provided in said display message;
    b) said telecommunications device silently receiving a plurality of individual, interactive display messages, temporarily storing each of said silently received interactive display messages in said dynamic storage buffer, and if an idle screen is being displayed, silently streaming individual ones of said stored display messages from said dynamic storage buffer for display on at least a portion of said display screen, and interrupting said displaying of said streaming display message to display a non-idle activity specific screen, and automatically, silently discarding display messages from said dynamic storage buffer in accordance with a display message discard scheme irrespective of a display message having been displayed on the display screen or not;
    c) broadcasting over a particular programming channel a stream of said provided interactive display messages by one or more of a plurality of individually addressable Base Transceiver Stations (BTS) that are part of said cellular telecommunications network, each said BTS providing bidirectional signal coverage over a predefined geographical area and capable of transmitting Point-To-MultiPoint (PTMP) messages over a PTMP Service functionality and capable of transmitting and receiving Point-To-Point (PTP) messages, said display messages being broadcast without consideration of their being received, being displayed, being retained or being discarded on a telecommunications device that has received said display messages; and
    d) receiving a message from a telecommunications device as a result of a user of said telecommunications device activating a transmission response mechanism that has been enabled by one of the broadcasted interactive display messages.

22. The method of claim 1, wherein $T_{DISCARD}$ is a discard time associated with the display message.

23. The method of claim 12, wherein $T_{DISCARD}$ is a discard time associated with the display message.

24. The method of claim 1, wherein the out-of-date message is a complete out-of-date message.

25. The method of claim 12, wherein the out-of-date message is a complete out-of-date message.

26. The method of claim 21, wherein said the message received from the telecommunications device as a result of the transmission response mechanism is a point-to-point (PTP) transmission.

27. The method of claim 21, wherein said telecommunications device is further adapted to check a display message as being complete before being displayed.

28. The method of claim 27, wherein said telecommunications device is further adapted to automatically discard an incomplete message immediately prior to its display.

29. The method of claim 21, wherein said telecommunications device is further adapted to automatically discard undisplayed display messages on a First In First Out (FIFO) basis.

30. The method of claim 21, further comprising determining that a message is an out-of-date message prior to the display of that message by determining if $T_{CLOCK} - T_{RECEIVE} > T_{DISCARD}$; where $T_{CLOCK}$ is the clock time of the personal cellular telecommunications device when said determining step is performed, $T_{RECEIVE}$ is the time of receipt of the display message at the personal cellular telecommunications device, and $T_{DISCARD}$ is a predetermined time interval.

31. The method of claim 30, wherein said message is a complete message.

32. The method of claim 21, wherein said display messages enable a subscriber to automatically activate one of at least two different point-to-point transmission response mechanisms from the list of: a voice call; an SMS; an internet session; an email; and a facsimile transmission, where each response mechanism is integrally provided in a display message and can be actuated by a dedicated response means associated therewith.

* * * * *